United States Patent
Washburn et al.

(10) Patent No.: US 7,624,397 B1
(45) Date of Patent: Nov. 24, 2009

(54) UNIVERSAL COMPONENT SYSTEM FOR APPLICATION SERVERS

(75) Inventors: Spike Washburn, Boston, MA (US); Simeon Simeonov, Lincoln, MA (US); Peter Muzila, Weston, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1494 days.

(21) Appl. No.: 10/277,625

(22) Filed: Oct. 22, 2002

(51) Int. Cl.
 *G06F 9/44* (2006.01)
 *G06F 9/46* (2006.01)
 *G06F 9/54* (2006.01)

(52) U.S. Cl. .................. 719/315; 719/330; 709/203

(58) Field of Classification Search .............. 719/315, 719/330; 709/203
See application file for complete search history.

(56) References Cited

U.S. PATENT DOCUMENTS

| | | | |
|---|---|---|---|
| 6,882,996 B2* | 4/2005 | Preisig et al. | 707/4 |
| 7,162,687 B2* | 1/2007 | Pelegri-Llopart et al. | 715/234 |
| 2002/0099738 A1* | 7/2002 | Grant | 707/513 |
| 2003/0023957 A1* | 1/2003 | Bau et al. | 717/140 |
| 2003/0084120 A1* | 5/2003 | Egli | 709/218 |
| 2003/0217044 A1* | 11/2003 | Zhang et al. | 707/3 |
| 2004/0003033 A1* | 1/2004 | Kamen et al. | 709/203 |
| 2004/0006653 A1* | 1/2004 | Kamen et al. | 719/330 |

* cited by examiner

*Primary Examiner*—Li B Zhen

(57) ABSTRACT

A system and method for an application server system is disclosed in which embodiments comprise components created using tags and markup to define extensible metadata for describing and also implementing the requirements and features of the component. Embodiments of the application server also preferably comprises a marshaling application for translating communications between an accessing client application and one of the requested components. Using the marshaling application and the extensible metadata within the component, embodiments of the system may preferably provide information concerning the capabilities and functions of the component enabling many different types of client applications to access and execute the component and receive all resulting data in the appropriate format or protocol.

12 Claims, 5 Drawing Sheets

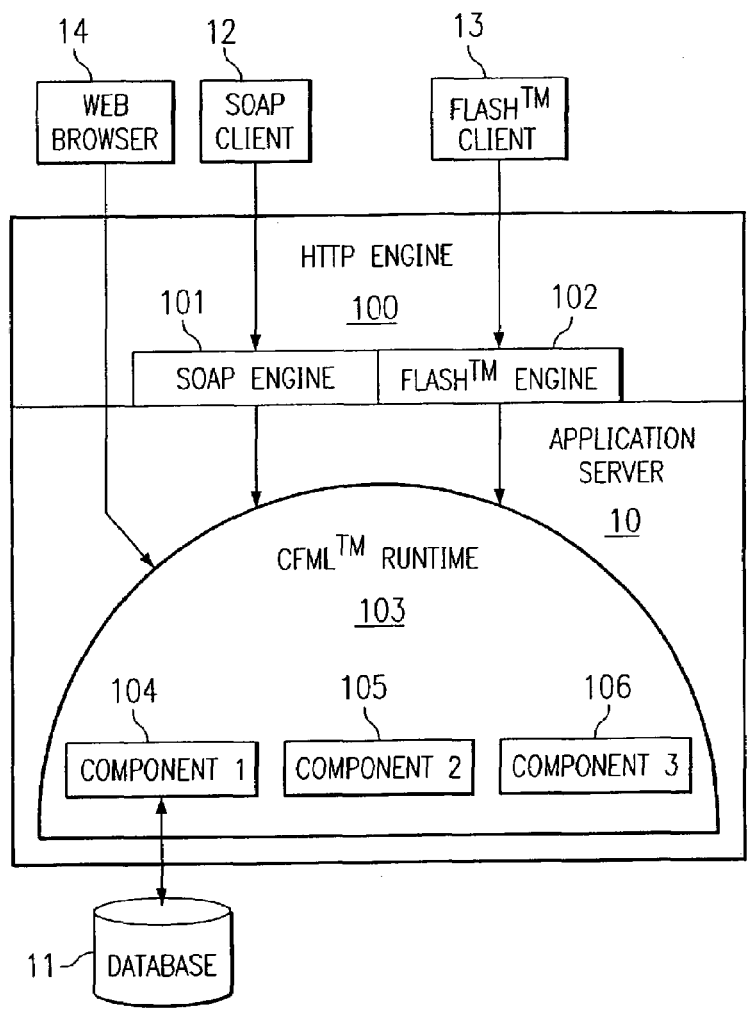

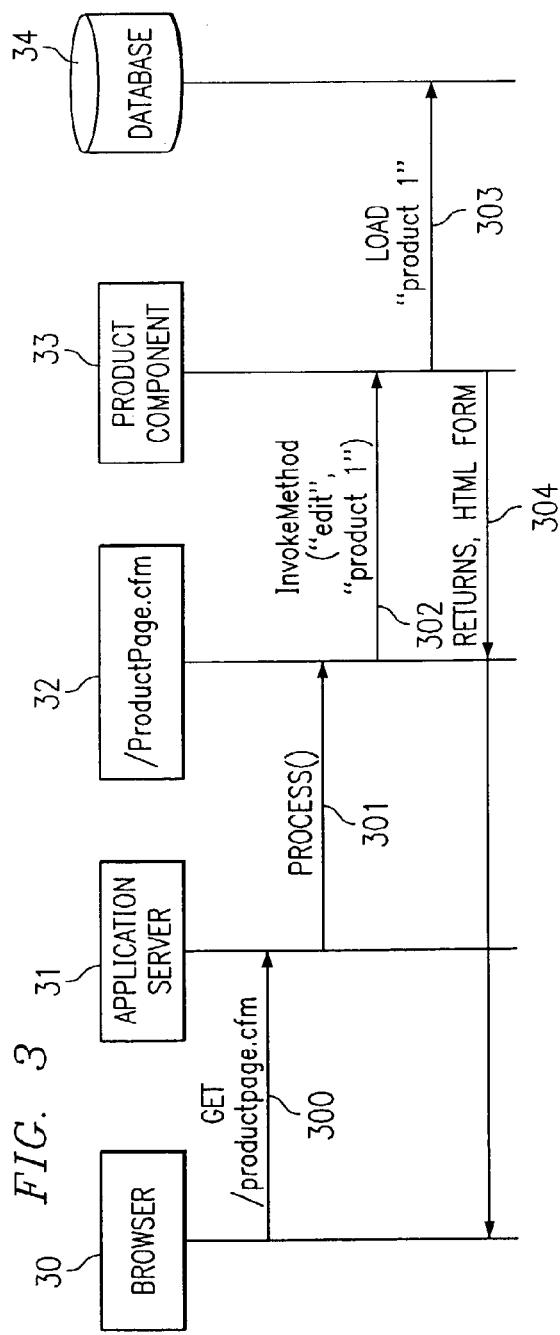

FIG. 5

```
200 ~ <component name="products" persistence="simple">
  201 — <property name="name" type="string"/>
  202 — <property name="sku" type="string"/>
  203 — <property name="price" type="float"/>
        .
        .
        .
  204 ~ <method name="edit"/>
  500 ~ <CFModule
              Template="…/edit.cfm"
                        _____/
                           501
              Action="submit">                    ↖
  211 ~ </method>                                    50
        .
        .
        .
  212 ~ </component>

501 — …/edit.cfm                                 /51
        .
        .
        .
  502 — <Form action="/components/Products?
                      method="submit">
  503 — <input…#thisObject.price#/>
  504 — <input…#thisObject.name#/>
        .
        .
  505 — </Form>
        .
        .
        .
```

UNIVERSAL COMPONENT SYSTEM FOR APPLICATION SERVERS

BACKGROUND OF THE INVENTION

Over the last two decades, the Internet has developed from a communication tool used mostly by academicians and researchers into a multi-billion dollar commercial media that has been interwoven into virtually every aspect of our lives. As the World Wide Web (WWW) grew to become the dominant Internet access tool, individuals and companies generally began to build Web pages for public access. In the beginning of this Internet revolution, most Web items were created using hypertext mark-up language (HTML). HTML is a text-based language that is used to format the display of information and provide linking between different pieces of information in such a manner that any person running an HTML-compliant Web browser will generally be capable of seeing the information presented as designed by the Web page creator.

Early developers would typically write HTML files using simple text editors and then place those HTML files onto Web servers. The Web servers would then generally be used to serve up the HTML files to any accessing applications, called clients. Once the client receives the HTML file, a Web browser on the client would typically access those pages and display them according to the format coded by the HTML. The basic extent of the interaction in this format then was that a user may typically enter a uniform resource locator (URL) into their Web browser, the request for the document corresponding to that URL would generally be sent across the Internet and received by a Web server. The Web server then usually determines what document the user wants and serves up that document by sending the HTML file back across the Internet to the client's Web browser. The Web browser then takes that document and renders it in a pretty way, so you may have formatting around your text, such as bold, colors, backgrounds, and the like.

The static nature of pure HTML established a limit to the interactivity and functionality available to Internet applications. In response to the growing demand for more Web functionality, dynamic applications began to evolve. Dynamic applications are typically able to merge static HTML with dynamic data and logic processing in the files served to accessing clients. Such dynamic applications generally led to the capability of developing business oriented applications. Business applications typically need more extensive interaction and processing of data. Such data is typically stored or processed in the business' back-end systems (i.e., the systems and computers controlled by the business and that hold the business' databases or files). Users connecting to a typical early business application were able to browse through on-line catalogs and buy the vendor's product directly from the Website. This process generally requires combining the staticness of HTML, for viewing the documents on the Website, with the processing of data and information stored in the back-end systems necessary for generating the HTML documents. Thus, the dynamic applications evolved into a system in which HTML Web pages are built as the application is executed using the data that exists in the business back-end systems.

Dynamic applications began by generally using common gateway interface (CGI) programs, which essentially allow a program to be written that runs in the context of the host Web server. The program would typically do nothing but possibly generate Web pages for the dynamic application. As dynamic applications grew in number and complexity, the amount of program and function logic hosted on the Web server led to the development of application servers, the next generation of Web functionality. An application server's main focus is to host all of the program and/or function logic that will be executed and interact with the business' back-end systems. In essence, therefore, the application server generally acts as middle-ware between the Web browser and the back-end systems.

With the continued development of dynamic applications and application servers, there typically became a much higher learning curve for developers to build these applications. Developers not only are required to understand the basic construction of Web pages using HTML, but are also required to understand the connectivity, interaction, and processing structures and requirements for working with the back-end systems. In a typical case using this newer architecture, a Web browser typically requests a Web page with a dynamic application, but now, instead of the Web page being served up directly by a Web server, an application server receives and processes the incoming request, and then executes a component program or application that interacts with the back-end systems to execute the functionality of the dynamic application. The application server then generates the HTML necessary to display the results of the dynamic application. The browser renders the HTML as before. So to the user on the front-end, not much has changed. However, the complexity on the application server and in the back-end has substantially increased.

Initially, dynamic applications are programmed using standard programming languages, such as C++ and C. However, the training and experience generally required for this standard programming prompted individuals and companies to develop higher-level scripting languages to "script" the functional elements of the dynamic applications. The main goal of scripting languages is to provide a more intuitive, less training-intensive means for full program functionality development. One such scripting language which grew out of the dynamic application evolution is MACROMEDIA'S COLDFUSION™. COLDFUSION™ became the first true script-based application server that brought the world of dynamic applications to the typical Web developer who did not have formal programming training. COLDFUSION™ and it's scripting language, COLDFUSION MARK-UP LANGUAGE™ (CFML™) allow Web developers, familiar with typical tag-based mark-up languages, such as HTML, to more easily script/program the dynamic integration of Web accessibility with the data-intensive back-end systems. The other primary scripting languages that either have been used to program dynamic applications or were specifically developed for dynamic applications include Practical Extraction Report Language (PERL), developed by Larry Wall, and MICROSOFT'S ACTIVE SERVER PAGES (ASP™).

One unfortunate result of bringing the ability to create complex dynamic applications to Web developers with little or no formal training in programming is that the applications that began to surface really had very little structure to the way they were created. Files are typically placed in ad hoc locations making it very difficult to manage and/or understanding how the application fits together and operates. Developers generally place the functional logic in any random directory, which impairs the ability to know exactly what that piece of page code was going to do. At the same time, other pages may be attempting to access and use that page. However, in order to use it properly, the calling page typically should understand how that other page code was authored and what must be done to properly access the page.

The problem with the ad hoc placement of components and files for implementing the application is further compounded by the possible ad hoc placement of data throughout the back-end system. For example, one set of developers may have created many different little applications. These applications each do a certain amount of processing on data within the back-end systems of businesses or enterprises established by a completely different group of developers. It may result that a particular piece of data needed to perform some of the processing could possibly be placed in any number of databases within the back-end systems. This ad hoc placement of necessary data generally makes it very, very difficult for users to access and view a new Website, or for Web application developers to view the back-end of a Website to determine how to design an application that can efficiently access and make use of the back-end systems.

Another problem began to emerge with the development of new client-types. In the beginning, most of the clients accessing Websites were typically Web browsers. With an almost singular client-type one of the only jobs for the application server was to generate HTML that may then be displayed to the user. However, as new clients emerged desiring connectivity to existing Websites, a new layer of work was created to facilitate supporting the new clients. Wireless application protocol (WAP) has been developed to facilitate Web access for wireless telephones using wireless mark-up language (WML). Similarly-scaled protocols facilitate connections by personal digital assistants (PDAs), such as PALM, INC.'s PALM PILOT™ PDAs. In addition to the new clients used by new devices, new client applications were developed for automating Internet access. Proxies, agents, search-bots, robots, spiders, and the like are generally programs that automatically perform searches of or execute components on designated Websites or databases. Instead of accessing the Website using a Web browser, these automated applications use different protocols to directly search the back-end systems and/or access application or component capabilities. For example, purchasing robots may be scripted/programmed by a user to search the Internet for the best price on a particular item, and then to purchase that item on the best Website.

Furthermore, new technologies are evolving for client-side applications in which data is served by the remote Web or application server to the client for processing and/or executing on the client. One such technology streams data from a remote location to the client to be displayed on a local player or interface. MACROMEDIA'S FLASH™ is being used in development of rich-client applications which, instead of requiring HTML rendered by the application server, generally uses data and FLASH™ operations from the application-side to be played on the client-side FLASH™ player. Application developers creating and/or adapting these dynamic applications across multiple client types must expend a large amount of time to rework and rebuild the applications to be able to support the new clients.

Two methods are in general use for allowing distributed applications to communicate with various technologies. In the first method, a customer must typically re-engineer an application every time it desires to support a new client. For instance, if an application is written to support access from browsers via hypertext transfer protocol (HTTP), but later is desired to support access to the same business logic via a mobile phone and other business systems, the application developer would generally have to engineer an entirely new set of entry points to be used by the mobile phone and another set for the business systems.

The second generally used method includes a customer developing its application to leverage access via a broker-based or proxy-type technology. The broker or proxy generally is designed for a single back-end contact protocol. Therefore, the application typically only needs to understand how to connect to the broker through the single back-end protocol. Each broker then may have a specifically designed external interface as well. For example, one broker may be able to provide external access by an HTTP client, while another broker provides external access by a mobile phone. The business logic of the application is able to leverage a single back-end protocol to access both brokers. Therefore, the different clients access the same business logic using a proxy-type system.

Examples of broker-based technology includes common object request broker architecture (CORBA), which uses interface definition language (IDL) for exposing metadata about the interface to the application; distributed component object model (DCOM), which uses a proprietary method from MICROSOFT CORPORATION to describe its metadata; and Web services, which use web services description language (WSDL) to expose its metadata. In the case of Web services, WSDL comprises extensible markup language (XML) to describe the metadata, but WSDL is typically not written directly by a developer. Instead, it is almost always generated by the broker technology. WSDL only describes a component's interface. It does not provide any specific implementation of the interface. Therefore, application developers typically code programs in full-blown object oriented programming languages, such as JAVA™, C++, or C# to provide the actual functionality for the Web service. The "reflection" technology, in such object oriented languages, allows the broker technologies to examine the objects' written by the programmers and then extract the metadata.

The problems with each of these methods is the complexity required to provide multi-format access to a customer's application. Either experienced programmers are needed to re-engineer the application every time a new access protocol is desired, or they must re-engineer or develop particular brokers or proxies for each new protocol.

BRIEF SUMMARY OF THE INVENTION

The present invention is directed to a system and method for implementing components on an application server using tags such that the components provide an object-based abstraction yet are implemented in a page-based scripting environment. Tags and mark-up are preferably used to describe the component metadata and also include the implementations of component methods either with inline script or code or by reference to external script or code. By providing for the creation of components using these descriptor tags and mark-up, the development process is preferably opened up more readily to page- or script-based developers, such as those working with HTML, ASP, PHP, and CTML™.

Extensive metadata is preferably included within the components to enable client-access to the component in a number of different ways: (1) via procedural constructs; (2) via tag-based constructs; (3) as Web or electronic services; (4) as FLASH™ services; and the like, without requiring a separate component for each different client access protocol. The extensive tag-based metadata within the components is preferably extensible, which facilitates component self-description in a number of ways, such as human-readable, component description, service description, and the like. The multiple self-description methods preferably provides each calling client or application developer with the information necessary to properly invoke and execute the component. The increased self-description and extensive metadata preferably allow more platform-independent use of the component much like an object, but without the rigid structural requirements of a true object.

One aspect of the present invention provides the ability for developers to create a single component that is preferably accessible via the multiple different client technologies, such as MACROMEDIA FLASH™, HTML, PDAs, Web services, and the like. As a component request is received by the application server, it is passed to the appropriate access engine or broker to convert or translate the component request from the format of the client, such as MACROMEDIA FLASH™, simple object access protocol (SOAP), or the like, into the format compatible with the called component. Likewise, when the component returns resulting data targeted for the accessing client, the access engine preferably reconverts the resulting information to the format or protocol expected by the client. All of the necessary marshalling back and forth between different access formats is preferably performed using access engines within the application server. Using this architecture, the component developer is generally not required to adjust the implementation or descriptors of the component because it is being accessed by various different client technologies. This streamlines and simplifies the entire development and implementation process, while still allowing for the creation of complex dynamic and distributed applications and Web services.

Furthermore, access by multiple different client technologies is preferably facilitated by the self-describing features of the components created according to the teachings of the present invention. The practical use of a component or application is generally only possible when either the calling application or its developer understands: (1) what the component does, (2) what the component needs to do what it does, and (3) what type of information the component returns when its done doing what it does. Without this information it is unlikely that a component will be properly used. However, components created according to the teachings of the present invention incorporate extensive, extensible, tag-based metadata for self-describing features that not only allow developers to read the physical code of the component, but also generates documentation for the developer responsive to description requests. In addition to the human-readable component description features, one aspect of an embodiment of the present invention provides component descriptions to accessing clients using the description language understood by the accessing clients.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a high-level block diagram illustrating an embodiment of an application server configured consistently with the teachings herein;

FIG. 2 is a partial script listing illustrating an example definition of an embodiment of a component configured consistently with the teachings herein using in-line coding to implement component methods;

FIG. 3 is an execution sequence diagram illustrating an execution sequence of an embodiment of a dynamic system configured according to the teachings herein;

FIG. 5 is a partial script listing illustrating an example definition of an embodiment of a component configured consistently with the teachings herein utilizing the reference form of method implementation;

FIG. 6 is a partial script listing illustrating a component definition embodiment configured consistently with the teachings herein.

DETAILED DESCRIPTION OF THE INVENTION

Figure 4:
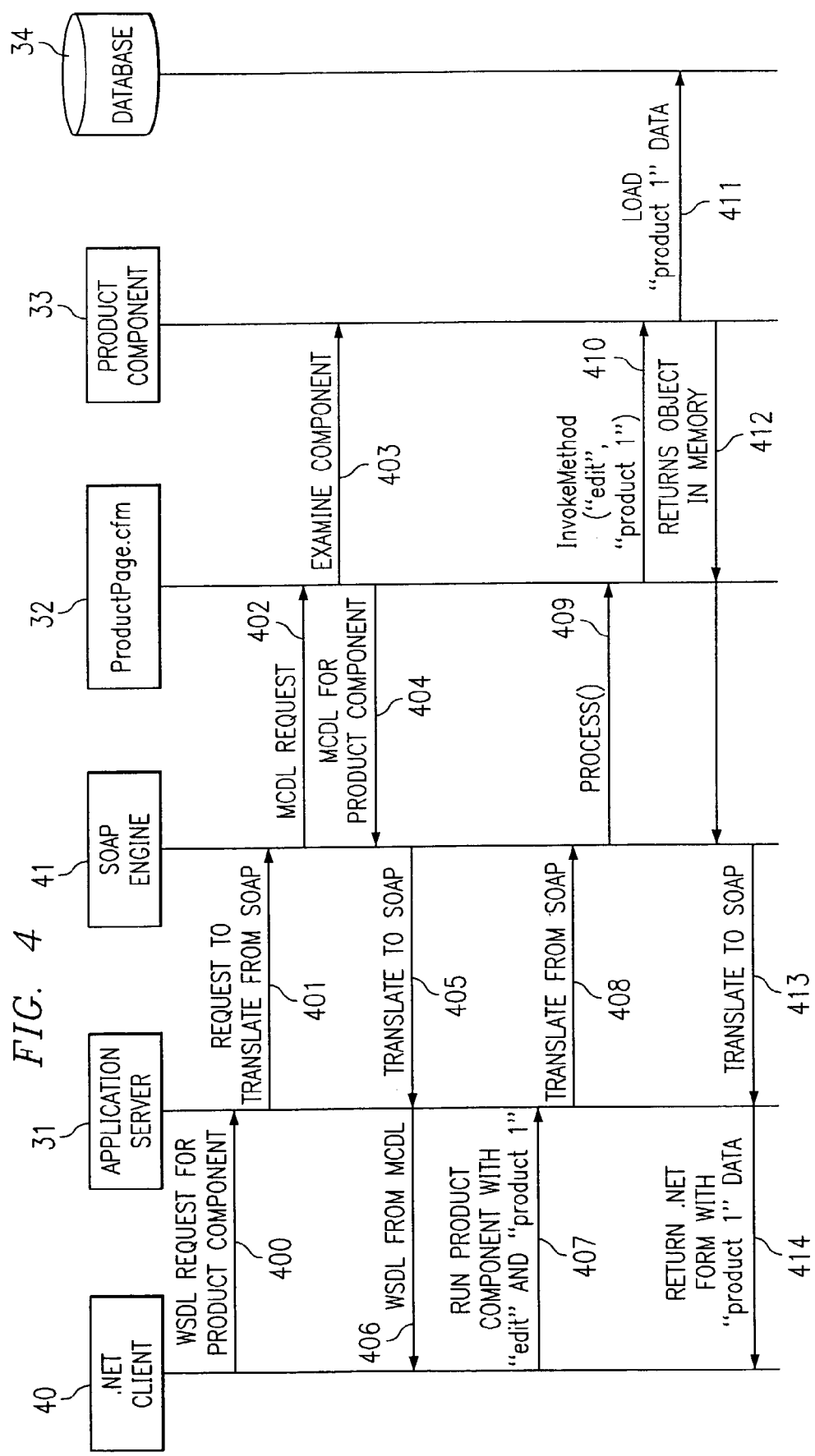
FIG. 4 is another execution sequence diagram illustrating an additional execution sequence of an embodiment of a dynamic system configured according to the teachings herein.

FIG. 1 is a high-level block diagram illustrating an embodiment of an application server configured consistently with the teachings herein and shows an overall architecture of how clients of various different types, are able to access components 104, 105, and 106 running on application server 10. For purposes of explanation, application server 10 may be programmed using MACROMEDIA'S COLDFUSION™ and CFML™. Thus, components 104, 105, and 106 would preferably be running within CFML™ runtime 103. The different clients, SOAP client 12, FLASH™ client 13, and Web browser 14, are exemplary clients that may access the Website running within application server 10. Application server 10 is made up of several different layers. Hyper-text transfer protocol (HTTP) engine 100 is the first layer providing a standard transfer protocol and interface with the Internet. From HTTP engine 100, the format/protocol of the particular client dictates the next step or layer within application server 10. In the example of SOAP client 12, it preferably connects to application server 10 using HTTP. However, because SOAP client 12 issues a SOAP-based request, it will be handed off by HTTP engine 100 to the next layer, SOAP engine 101. SOAP engine 101 marshals or translates the SOAP format/protocol request into a request or message compatible with CFML™ runtime 103. Similarly, FLASH™ client 13 would preferably connect through HTTP engine 100 to another layer, FLASH™ engine 102. Engines 101 and 102 are types of brokers and are therefore responsible for marshalling and de-marshalling client requests or messages that arrive in proprietary or incompatible formats or protocols into a format or protocol compatible with CFML™ runtime 103 running in application server 10. In the case of Web browser 14, the HTTP and HTML it communicates are more directly compatible with CFML™ runtime 103. Therefore, requests and communications transmitted from Web Browser 14 preferably pass straight through into CFML™ runtime 103.

Several different user-defined components, component 104, component 105, and component 106, are available on application server 10. Components 104-106 are preferably designed according to the teaching of the present invention to incorporate extensive metadata tags, such that the description, implementation, function, or operation of the component are tag-accessible. The operations available to the clients may vary based on the way that the component is defined; however, because of the extensive metadata incorporated into the component it is preferably accessible by many of the different clients without having to understand how those different clients connect to CFML™ runtime 103. Components 104-106 may comprise any number of different operations or functions, depending on the developers preferences. For purposes of example only, component 104 may comprise an account access function, such as an operation to access a bank account balance or the like.

In operation, a component may require access to a backend system or other external resources or data repositories, such as database 11. Component 104 may have data operations that require interaction with database 11. To implement such interaction, component 104 may include database operators to search, replace, or update database entries. A number of different database languages exist that facilitate such database interaction; structured query language (SQL) is possibly the most widely-used. Any of SOAP client 12, FLASH™ client 13, or Web browser 14 may preferably access and execute any of the operations that components 104-106 expose. Once the executed operation is complete, the marshalling engines, SOAP engine 101 and FLASH™ engine 102, preferably marshal the results from components 104-106 back into the appropriate format/protocol for which ever of SOAP client 12 or FLASH™ client 13 called the component. In many cases, a component executed directly by Web browser 14 will typically generate HTML so there's not really marshalling or de-marshalling that needs to be done there. The typical HTML results or output from components' 104-106 are generally sent straight back through HTTP engine 100 to Web browser 14.

The preceding example illustrates the execution of components by accessing clients. However, before a client initiates access to a component, or even before a developer creates the client application, it may be necessary to determine the requirements and capabilities of a component. The development of XML has increased the ability for cross-platform descriptions through WSDL. WSDL is a language that defines an XML document specially formatted to define where the service is located, what communication protocols the service uses, and what the service does. It typically defines everything necessary to write a program or application to work with the Web service. WSDL uses a set of SOAP messages to perform the description. Therefore, because not all applications are SOAP-compliant, not all client applications are compatible with WSDL. Each client will generally have its own rules defining how a component should describe itself. For example, considering FIG. 1, if SOAP client 12 wants to interrogate component 104 to find out what its capabilities are, SOAP client 12 will submit a request to application server 10 through HTTP engine 100 for a WSDL description of component 104. HTTP engine 100 transfers the request to SOAP engine 101 to translate the SOAP request in to a protocol/format compatible with CFML™ runtime 103. CFML™ runtime 103 is responsible for examining component 104 to determine what operations component 104 exposes for use by SOAP clients. CFML™ runtime 103's internal description of component 104 will then be translated into a WSDL packet by SOAP engine 101 to be sent back through HTTP engine 100 to SOAP client 12.

This process is similarly repeated for each of the other different types of clients when a description is requested. In the case of FLASH™ client 13, the description request received by HTTP engine 100 is forwarded to FLASH™ engine 102 for marshalling or translation. CFML™ runtime 103 then executes the description request generating an MCDL™ description (that's the MACROMEDIA COMPONENT DESCRIPTION LANGUAGE™) of the component and its capabilities. Because FLASH™ client 13 is compatible with MCDL™, the MCDL™ document is passed back to FLASH™ client 13 without the need for any further marshalling or translation.

In the case of Web browser 14, browsers typically only require HTML to render, so a developer interested in determining the capabilities of a component may access the capabilities through application server 10. Browsers, in general, have no use for components; they do not understand them and cannot typically make any sense of them. However, a developer in the process of authoring applications that use components may, in many cases, needs to understand how that component works and what it's capabilities are. One embodiment of a system configured according to the present invention exposes a mechanism for a developer to access the component through Web browser 14. After receiving a request from Web browser 14, CFML™ runtime 103 will preferably translate the features and capabilities description of component 104 into an HTML document that defines the display of the features and capabilities of component 104 to the developer on Web browser 14. This feature is similar to the feature in JAVA™ programming where certain JAVA™ compatible documents may self-describe what the features are of a class file into an HTML format for developers to use.

FIG. 2 is a partial script listing illustrating an example definition of an embodiment of a component configured consistently with the teachings herein. In order to create a component with a structure consistent with the teaching of the present invention, a developer preferably authors a component definition file that appears similar to an XML document. Component definition 20 preferably comprises outer tag line 200 that describes the name assigned to the component and defines the data persistence level of the component. Data persistence defines whether data needs to be stored for access later between application server restarts, or if it needs to go back into a database or other storage area. The developer preferably has the ability to define the type of persistence that they want directly in outer tag line 200. In the partial example illustrated in FIG. 2, a simple persistence mechanism, which would be one provided by the application server, has been defined.

In authoring a simple, self-describing component, a developer typically should describe the certain attributes including the fields or properties that are expected as input and/or output parameters on all occurrences of a product instance. Component description 20 includes property definitions 21, for defining attributes of the component, and method definitions 22 that further include descriptions of the method and functions executed by the component, line 204, and method implementation 23, lines 205-211, that includes the implementation of the method/function of the component. In the partial example illustrated in FIG. 2, a product, in most typical systems, would likely be described using a name, line 201, a stock-keeping unit (SKU), line 202, a price, line 203, and any other identifying characteristics or production descriptors that a developer desires to incorporate. These product identifiers would preferably group to form property definitions section 21. In application, when a user desires to browse a Website to purchase a product, the application server, through execution of the component, would pass the product's name, SKU number, and the price to be rendered on the user's browser.

On execution, the component accesses a back-end system, or some other external or internal database or system to retrieve the property definition particulars. The application server uses this retrieved and processed information to generate the HTML file displayed by the user's browser. Properties are typically assigned a type that map to corresponding back-end system or database types. Thus, properties may be strings, integers, doubles and floats, dates, times, and/or even another type of component. For example, if there is another component defined in the system, perhaps called 'warehouse,' where products are actually stored, then one of the properties on a component could be a type warehouse.

Also within a component, there are methods or operations implementing the functionality that can be executed by clients. In the example shown in FIG. 2, method definitions section 22 exposes an edit method that can be invoked by clients. If a client were to invoke the edit method, the application server would generate, for the client's Web browser, the HTML form that could be used to edit the data of that particular component. Method implementation section 23, which is preferably within method definitions section 22, contains, either in-line or by reference, the sequence of execution instructions or scripts that could be used to generate the form that contains not only the actions or operations, but also possibly the URL for data or other components. Line 206 shows a Form tag with an action that equals the component's URL. The "submit" component/method, not shown in FIG. 2, would preferably be defined at the given URL. As the component data is retrieved in operation, the data would then be included in the HTML form generated to go back to the user. Lines 207-208 illustrate a sample notation which inserts the product's price value, line 207, and name, line 208, into the HTML that gets generated for the client.

It should be noted that any other number of methods and/or components could be defined and created in this way. In the particular case of FIG. 2, the illustrated method defines HTML that goes back to the client. There may preferably be more purely logical methods or components. For instance, another method may be created to perform a purchase operation defined to accept the SKU number of the product that the user wants to purchase. The purchase method or component may preferably perform operations to bill the user for a new product instance, in addition to setting up any shipping that that product needs. The purchase component would preferably facilitate all of that functionality in such an example.

FIG. 3 is an execution sequence diagram illustrating an execution sequence of an embodiment of a dynamic system configured according to the teachings herein. Browser 30 may comprise any type of HTML browser, such as MICROSOFT CORPORATION'S INTERNET EXPLORER™, NETSCAPE COMMUNICATION CORPORATION'S NETSCAPE NAVIGATOR™, or the like. ProductPage.cfm 32 is an example of a random Web page running on application server 31. In operation, ProductPage.cfm 32 may include a component call capability to leverage product component 33. Product component 33 may be a component created to perform some of the functions and operations discussed with regard to FIG. 2. A user on browser 30 may decide to visit a commerce site to look up the prices of a product the user intends to buy. By clicking on a certain link for this action, browser 30 issues Get/ProductPage.cfm command 300 to application server 31. Application server 31 takes the argument from command 300 and processes the argument in process( ) step 301 by accessing and running Web page ProductPage.cfm 32. In the processing of ProductPage.cfm 32, it is compiled into a JAVA™ class or some other, related executable that includes the function for invoking a component method.

In response to the user's request, ProductPage.cfm 32 determines that it wants to execute the "edit" method on product component 33 to edit a product instance named "product1." Product1 could be a MACROMEDIA JRUN™ product, it could be COLDFUSION™, it could be some toy available on a merchant's website, or the like. However, the product page is interested in displaying the "edit" page for "product1." ProductPage.cfm 32 includes a special tag or function that issues invokeMethod("edit", "product1") command 302 to invoke product component 33 and its defined methods/operations. Using the "edit" method of product component 33 with the "product1" product name parameter, product component 33 looks up an enterprise Javabean (EJB) on application server 31, that represents "product1", and then that EJB is responsible for accessing database 34 to load the record associated with the product instance, "product1", in step 303. Once that data gets loaded from database 34, it is inserted into the page scope of ProductPage.cfm 32. The implementation of the "edit" message of product component 33 generates an HTML form and includes the values of the properties of the product instance loaded from database 34. So in the example described, the product's name, price, and SKU number would be included in the generated HTML document. Product component 33 returns the entire HTML document to ProductPage.cfm 32 in return line 304. Because the resulting information is in HTML, which is fully compatible with browser 30, application server 31 will send the resulting document directly to browser 30 for rendering and displaying to the user.

FIG. 4 is another execution sequence diagram illustrating an execution sequence of an embodiment of a dynamic system configured according to the teachings herein. Instead of a Web browser client accessing product component 33, as shown in FIG. 3, FIG. 4, illustrates .NET™ client 40, a dynamic application platform from MICROSOFT CORPORATION, accessing product component 33, wherein application server 31, ProductPage.cfm 32, and product component 33 are generated in COLDFUSION™. .NET™ client 40 would typically use the SOAP Web services application-program interface (API) to access product component 33 as a Web service. However, in order to do so, .NET™ client 40 usually needs the WSDL document generated for product component 33. .NET™ client 40 issues WSDL-request 400 to application server 31 using .NET™ client 40's native SOAP protocol. On receiving a request in SOAP, application server 31 issues request-to-translate 401 to SOAP engine 41. SOAP engine 41 translates the WSDL request into MCDL™-request 402 to ProductPage.cfm 32. Because COLDFUSION™ is a MACROMEDIA product, it's description language will be typically MCDL™.

ProductPage.cfm 32 preferably examines the capabilities and requirements of product component 33 in step 403. ProductPage.cfm 32 then preferably issues MCDL™ 404 to SOAP engine 41. The MCDL™ is then preferably translated or marshaled back to the SOAP format in translate-to-SOAP 405. Application server 31 would then preferably return the requested WSDL to .NET™ client 40 in WSDL-from- MCDL™ 406. .NET™ client 40 interprets the WSDL and issues run product component with "edit" and "product1" command 407 based on the information obtained from the description file, WSDL. Application server 31 again preferably issues translate-from-SOAP command 408 for SOAP engine 41 to translate the received SOAP request. Once translated, application server 31 issues process( ) command 409 which accesses ProductPage.cfm 32 and compiles it into the JAVA™ class or other, related executable, as described in FIG. 3. Compiled ProductPage.cfm 32 issues invokeMethod ("edit", "product1") command 410 to invoke the "edit" method of product component 33.

Product component 33 uses an EJB with the "edit" method to search and perform load-"product1"-data step 411 on database 34 to retrieve the data required. Because product component 33 has been created according to the teaching of the present invention, it preferably includes additional descriptor tags and mark-ups that are used with a SOAP client. Instead of generating the HTML form with the retrieved data, as in FIG. 3, because .NET™ client 40 uses the SOAP protocol, product component 33 preferably generates an object or data structure in memory using the data loaded from database 34 and returns that object information to application server 31 running ProductPage.cfm 32. However, before returning the object information or data structure to .NET™ client 40, SOAP engine 41 executes translate-to-SOAP command 413 before application server 31 executes return-object-information-to-.NET™-client 414. .NET™ client 40 then preferably reads the returned information and continues to process it's dynamic and/or distributed applications.

It should be noted that components created according to the teachings an embodiment of the present invention may preferably have methods implemented using in-line scripting/coding, as shown in FIG. 2, or may also use direct or indirect referencing to implement the methods. FIG. 5 is a partial script listing illustrating an example definition of an embodiment of a component configured consistently with the teachings herein utilizing the reference form of method implementation. In FIG. 2, the Execute tag includes HTML and CFML™ intermixed to generate the form for the edit page. Display hammers, which are applications that generate HTML for viewing by browser clients, tend to include a substantial amount of HTML in the same page with another application server language, such as CFML™. There might be HTML related to displaying the object, HTML relating to editing the object, or HTML related to displaying a list of all the different objects available. One alternative provided in CFML™ allows the developer to place the implementation into a template file and simply refer or point to the template within the component file. Turning to FIG. 5, component definition 50 is very similar to component definition 20 (FIG. 2) in lines 200-204. However, at the method tag, line 204, the implementation of the method, which had been inline script in FIG. 2, is replaced with a template tag, line 500, that points to address 501 of the template containing the implementation, " . . . /edit.cfm". Template description 51 is located at address 501. When a client executes the component, the component points to template description 51 to execute the "edit" method. Template description 51 contains the scripts and operations required for implementing the "edit" method, lines 502-505. The implementation does not drastically change from FIG. 2, only the manner in which the implementation is executed.

FIG. 6 is a partial script listing illustrating a component definition embodiment configured consistently with the teachings herein. Component definition 60 defines method 61 using a tag based structure. One method which may be used to read the metadata of component definition 60 is to parse through component definition 60 for each metadata entry. For example, in relation to component definition 60, a parsing application may obtain the metadata defining the method name, getStockPrice 602, the type of variable that results from the method, number 603, the access method, remote 604, the argument name, companyName 605, the variable type for the argument name, string 606, and a boolean variable defining whether the argument is required or not, true 607. Once each of the metadata entries has been determined, they may be used by any of the brokers to generate HTML, WSDL, XML, and similar protocol representations of component definition 60's structure.

Figure 7:
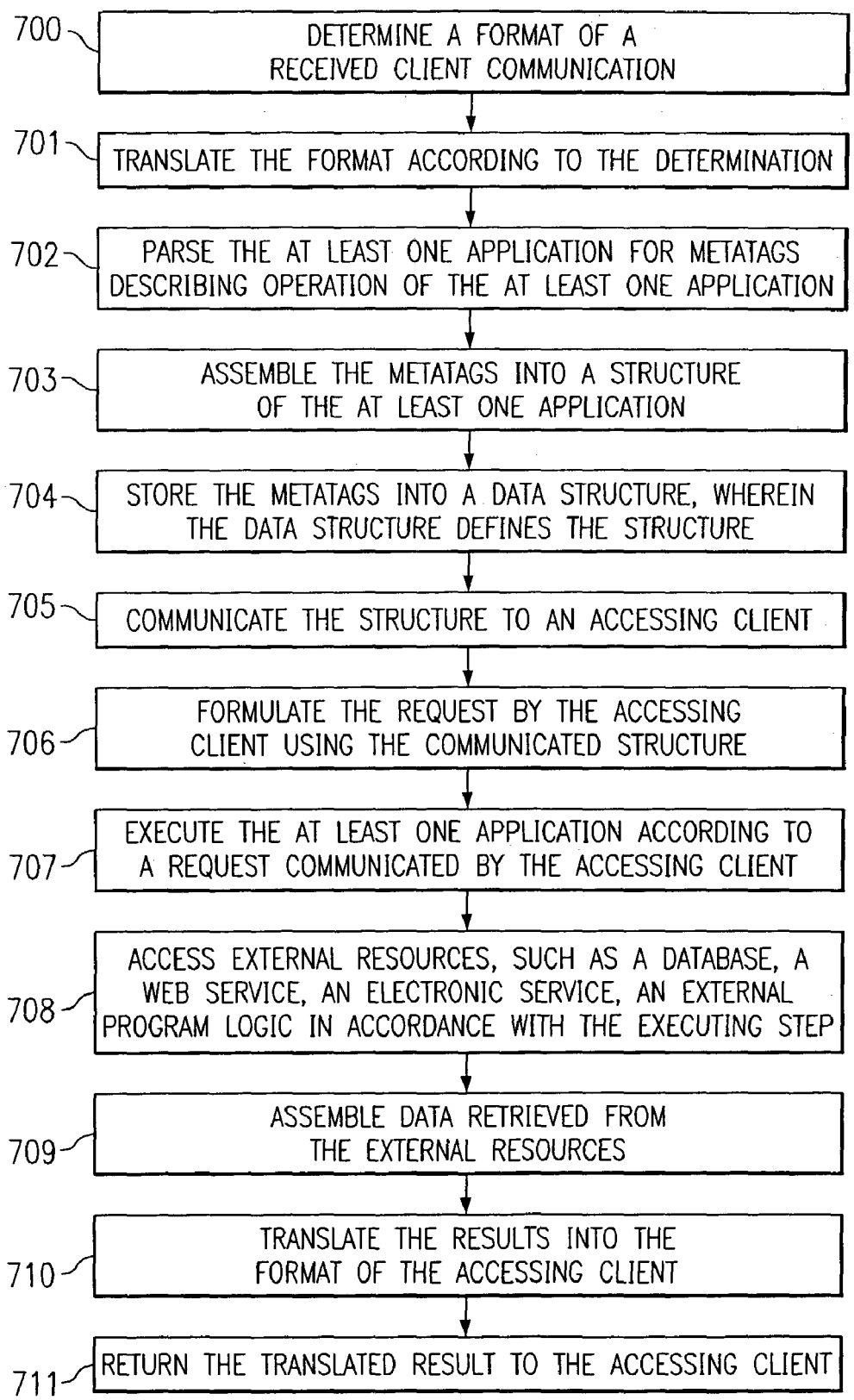
FIG. 7 is a flowchart illustrating steps performed in embodiments of an application server having universally accessible components as described herein.

FIG. 7 is a flowchart illustrating steps performed in embodiments of an application server having universally accessible components as described herein. In step 700, the format of a received client communication is determined. In step 701, the format is preferably translated according to the determination. An application on the application server is preferably parsed for metatags that describe the operation of the application in step 702. In step 703, the metatags are preferably assembled into a structure of the application. In certain embodiments, the metatags may be stored into a data structure, in optional step 704. In step 705, the structure is communicated to the accessing client. The accessing client uses the communicated structure in step 706 to formulate a request. In step 707, the application server executes the application according to the request communicated by the accessing client. In step 708, if necessary, external resources, such as a database, a Web or electronic service, or some external program logic are accessed in accordance with executing the application. In step 709, the data retrieved or processed is assembled and translated, in step 710, into the format of the accessing client. In step 711, the translated result is returned to the accessing client.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An application server having a computer-readable medium, said computer readable medium having stored thereto:
    a web page;
    at least one component external to said web page, wherein said component comprises:
        functionality operations for performing a desired task requested by the web page; and
        descriptor tags, wherein said descriptor tags describe said functionality operations;
    a marshalling interface for translating all communication between a client and said at least one component, wherein said marshalling interface comprises a plurality of format brokers, wherein each of said plurality translates a client format into a component format, and wherein said communication includes requests from said client for at least one file describing operation of said at least one component, transmissions of said at least one file describing operation to said client, requests from said client to execute said at least one component, and transmissions of results of said executed at least one component to said client;

a documentation parser for parsing said descriptor tags from said at least one component, wherein said documentation parser generates at least one file describing operation of said at least one component responsive to a request from said client, wherein said file comprises a data structure incorporating said descriptor tags; and a data interface for performing data processing responsive to said functionality operations.

2. The application server of claim 1 wherein said functionality operations comprise at least one of:

inline programming code for performing said desired task; and a reference to program logic at another location for performing said desired task.

3. The application server of claim 1 wherein said data interface accesses at least one of:

a database;
a Web service;
an electronic service; and
a back-end system.

4. A method for serving at least one application defined using page-based scripting technology, said method comprising:

determining a format of a received client communication from a client accessing a web page;

translating said format according to said determining;

parsing at least one application for metatags describing operation of said at least one application;

storing said metatags into a data structure, wherein said data structure defines a structure of said at least one application;

translating said data structure into said format;

communicating said translated data structure of said at least one application to said client, wherein said at least one application is external to said web page;

translating, according to said determining, a request communicated by said client to execute said at least one application;

executing, responsive to said translated request, said at least one application;

assembling data retrieved from said external resources translating a result of said executing into said format of said client; and returning said translated result to said client.

5. The method of claim 4 further comprising:

formulating said request by said accessing client using said structure.

6. The method of claim 4 wherein said executing step includes:

executing function logic coded in line with said at least one application.

7. The method of claim 4 wherein said executing step includes:

calling remote logic for performing a function of said at least one application.

8. The method of claim 4 wherein said external resource comprise at least one of:

a database;
a Web service;
an electronic service; and
external program logic.

9. A computer readable medium having stored thereto computer-readable instructions that, when executed, cause a computing device to perform steps comprising:

receiving a service request from a Web user accessing a web page;

translating said service request from a Web user format to an application module format;

responsive to said translated service request, parsing an application module for metadata tags and assembling said metadata tags into information regarding said application module, wherein said application module is external to said webpage;

translating said information regarding said application module into said Web user format;

transmitting said translated information regarding said application;

receiving a function request from said Web user;

translating said function request into said application module format;

executing said translated function request to perform a desired function, wherein said executing includes:

accessing data required to execute said function request; and processing said data required to execute said function request; and returning results of said executing to said Web user, wherein said returning said results includes:

translating said results into said application module format; and communicating said translated results to said Web user.

10. The computer readable medium of claim 9, the steps further comprising:

generating said function request according to said information regarding said application module.

11. The computer readable medium of claim 9 wherein said executing includes:

performing logic commands written in line with said application module.

12. The computer readable medium of claim 9 wherein said executing includes:

calling a remote operation for performing a function of said application module; and processing said remote operation.

* * * * *

UNITED STATES PATENT AND TRADEMARK OFFICE
CERTIFICATE OF CORRECTION

PATENT NO. : 7,624,397 B1  
APPLICATION NO. : 10/277625  
DATED : November 24, 2009  
INVENTOR(S) : Spike Washburn, Simeon Simeonov and Peter Muzila It is certified that error appears in the above-identified patent and that said Letters Patent is hereby corrected as shown below:

Column 13, Line 52, Claim 4  
    Insert the following line --accessing external resources in accordance with said  
        executing--

Column 14, Line 30, Claim 9  
    Following the word "application" insert --to said Web user--

Signed and Sealed this

Twenty-sixth Day of January, 2010

David J. Kappos  
*Director of the United States Patent and Trademark Office*

UNITED STATES PATENT AND TRADEMARK OFFICE
CERTIFICATE OF CORRECTION

PATENT NO. : 7,624,397 B1 Page 1 of 1
APPLICATION NO. : 10/277625
DATED : November 24, 2009
INVENTOR(S) : Spike Washburn et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 1,494 days.

should read (*) Notice: Subject to any disclaimer, the term of this patent is extended or adjusted under 35 U.S.C. 154(b) by 1,774 days.

Signed and Sealed this

Fourteenth Day of September, 2010

David J. Kappos
*Director of the United States Patent and Trademark Office*